United States Patent Office 3,110,695
Patented Nov. 12, 1963

3,110,695
PROCESS FOR POLYMERIZING METHYLMETHACRYLATE IN PRESENCE OF POLYETHYLENE OXIDE
Raymond John Ceresa, Harpenden, England, assignor to Koppers Company, Inc., a corporation of Delaware
No Drawing. Filed July 15, 1960, Ser. No. 42,976
2 Claims. (Cl. 260—45.5)

This invention relates to a process for the preparation of polymeric materials from mixtures of polymers and monomers.

In British applications Nos. 32,031/55, 14,107/56, 35,908/56, 18,907/57, 21,881/57, 1,339/59, 2,216/59, and 2,712/59 processes are described for the production of polymeric materials which comprise subjecting a mixture of a high molecular weight polymer, polymerizable olefin monomer and other additive or additives if required, to mastication under conditions capable of shearing the polymer molecule into polymeric free radicals. By these processes block copolymer containing products are relatively easily prepared from high molecular weight polymers such as natural and synthetic rubbers, polystyrene, polymethyl methacrylate, polyvinyl acetate, polyvinyl chloride, etc., since the polymer/monomer mixtures are visco-elastic over considerable polymer-monomer composition ranges. The use of suitable solvents also increases the visco-elasticity when the monomer has a low swelling effect on the polymer. The production of block copolymers from resinous, wax-like and semiliquid polymers such as epoxide polymers, polyesters, phenol formaldehyde resins, coumarone-indene resins, copal and similar naturally occurring resins, shellac, ester gums, rosin, etc., is difficult due to the generally high solubility of the resinous polymer in the monomer. For the application of the aforementioned patent applications it is necessary that the polymer/monomer mixture is visco-elastic, that is, "rubbery" as defined in the applications, in order that effective shear may be applied to rupture the polymer molecules. Liquid resins, such as epoxide resins used for casting, wax like resins, such as polyethylene oxides and low molecular weight polyhydrocarbons, and low molecular weight resins, such as first stage phenol/aldehyde resins, are thereby excluded from the aforementioned patent applications since they do not form visco-elastic compositions when mixed with monomers except possibly at very low temperatures or over very narrow polymer/monomer composition ranges.

The object of the present invention is to provide a process whereby polymeric materials may be produced, which contain linear or grafted block copolymer fractions together with homopolymers, from low molecular weight solid and liquid resins and polymerizable olefinic monomers. A low molecular weight resin is dissolved in a polymerizable olefinic monomer and the monomer is polymerized by free radicals initiated in the monomer. Depending upon the initiator used, its concentration, and the polymer/monomer system, the application of heat to initiate polymerization may or may not be necessary. Polymerization may be carried out by bulk, suspension, or solution polymerization techniques.

The resins and liquid polymers used in this process are such that they can function during polymerization as chain transfer agents, transfer taking place via hydrogen atoms, halogen atoms or other labile atoms or groups of atoms present in the resin molecules. Transfer to monomer, to polymer, to solvent, and to catalyst may also take place thereby by forming homopolymer. In general polymerization is initiated by the effect of heat on the added catalyst and transfer with some of the resin molecules takes place. The resin radicals so formed initiate linear or grafted block copolymers of the general type R.M.M.M.M.M.M.M.M. . . . ,where R is a resin molecule and M a unit of the polymerized monomer The structure of the block copolymeric fraction will depend upon the degree of transfer and the termination processes occurring during the copolymerization The products so formed contain, therefore, unreacted resin, homopolymer and linear, grafted or complex block copolymer.

The proportion of block copolymers present in the product depends upon:
 (a) the chemical nature of the resin, monomer, and initiator and solvent if present;
 (b) the concentration of resin, monomer and initiator and solvent if present in the reaction system;
 (c) the temperature of the copolymerization process;
 (d) the concentration of any polymerization inhibitors or modifiers such as oxygen, hydroquinone or mercaptan dissolved in the system;
 (e) the presence of diluents, fillers, crosslinking agents, colourants, pigments or other additives which may be added during the process and prior to its completion. By a suitable choice of these reaction conditions, polymeric materials with a wide range of block copolymer content can be prepared from a given resin and a given monomer.

The presence of the block copolymer fraction in the products which form the subject of this application bestows advantageous properties to these products. Compatability between the resin and the polymer is improved, very often when only a minor proportion of the total product is block copolymer, so that the tendency for phase separation of the constituents on a macroscale is greatly reduced. Thus this process can eliminate the necessity of applying tedious milling, extrusion or other mixing processes in order to obtain a blend of resin and high molecular weight polymer.

Amongst the resins which may be used for the process of this invention may be mentioned epoxy resins, phenol aldehyde resins, amine aldehyde resins, coumarone indene resins, copal and other naturally occurring gums and resins, shellac, ester gums, rosin, furfuraldehyde resins and their liquid homologues, and liquid polymers such as polyvinyl ethers, polyvinyl acetals. Wax and gumlike polymers, which are by their nature excluded from the aforementioned list of patent applications, can also be used in this process. Examples of such low molecular weight materials are polyethylene glycols, polypropylene glycols, silicone gums and epoxidised oils.

Amongst the monomers which may be used in this process are included acrylic acid and its methyl and higher esters, methacrylic acid and its methyl and higher esters, styrene and its substituted polymerizable derivatives, vinyl acetate and its other acid homologues such as vinyl caprocate, acrylonitrile and other higher nitrile homologues such as methacrylonitrile, vinyl and vinylidene chlorides, fluorides and bromides, acrylamide and higher amide homologues such as methacrylamide and substituted acrylic amides, N-vinyl pyrollidone, alkyl vinyl, alkyl isopropenyl and higher vinyl and isopropenyl ketones such as propyl vinyl ketone, vinyl pyridenes, ethylene dimethacrylate and divinyl benzene, and solid monomers such as alkali acrylates and methacrylates, acrylamide derivatives, etc., which are soluble in or fluxable with the solid or liquid resin.

Amongst the initiators which may be used for this process are included benzoyl peroxide, methyl ethyl ketone peroxide, and other peroxides which are thermally decomposed into free radicals capable of initiating vinyl polymerization, azo bis isobutyronitrile, peresters such as tertiary butyl perbenzoate, hydroperoxides such as tertiary butyl hydroperoxide, N-nitrosoacylanilides such as N-nitroso acetanilide, and other such similar compounds which decompose into free radicals on heating. Also to be included in the initiators which may be used in this process are the peroxidic compounds formed from vinyl monomers by reaction with atmospheric or other oxygen or with ozone or other oxidising agents. When there is no necessity to restrict the upper temperature attained by the polymerizing system because of the isothermic nature of the polymerization reactions, polymerization may be intiated with certain monomers, such as styrene, by thermal action without the addition of peroxidic or other catalysts to those which may be present by fortuitous oxidation and peroxidation of the monomer or trace impurities. With certain resins polymerization may be initiated by the resin component through peroxidic or hydroperoxidic groups formed on the resin molecules either fortuitously or by design by ozonolysis or similar established techniques.

In carrying out this process the resin component may be a mixture of resins in any desired proportion, similarly the monomer may be a mixture of copolymerizable monomers, provided in each case that the overall choice of resins and monomers is such as to give a compatible mixture at the concentrations chosen. The initiation may likewise be carried out by a mixture consisting of more than one of the aforementioned initiators. Diluents, fillers, pigments, plasticizers, crosslinking agents, mercaptan or other modifiers may be incorporated during or after the polymerization process.

The components used in this process must not be strong inhibitors of free radical polymerization. Thus a liquid polysulphide resin containing 5% of mercaptan groups can not be used in the process of this invention but commercial monomers containing of the order of 0.1% of hydroquinone or other polymerisation inhibitor may be used without removing the inhibitor. It is necessary, in general, to slightly increase the concentration of initiator used in order to counteract the inhibiting effect of the additive in the monomer, in this case resins containing high proportions of reactive phenols, sulphides, amines, nitro-groups, etc., are not suitable for the processes of this invention. When carrying out this process in solution, to achieve the maximum possible block copolymerization, it is necessary to choose as a solvent one which does not appreciably take part in transfer reactions with the growing polymer radicals.

In the process of this invention, by polymerizable olefin compounds, referred to as monomers, is to be understood compounds containing unsaturated carbon to carbon linkages which are capable of addition reactions, induced by free radicals, to produce polymeric substances which are composed of monomer units bound together by chemical bonds. By resins is to be understood relatively low molecular weight compounds, with number average molecular weights less than 20,000 and preferably less than 5,000, which are characterised by their brittleness or fluidity at room temperatures, that is at 15 to 30° C., low softening points and low viscosities at the melt temperatures compared with thermoplastic high polymers. Resins are further distinguished by their property of being capable of conversion to a thermoset infusible system by suitable curing agents or by the application of heat alone.

The products from this process can be thermoset by curing with any of the curing agents which have been developed for the particular resin component of the block copolymer containing product.

Thus the products from this invention may be used as casting resins, laminating resins, impregnating resins, potting resins, encapsulating resins, foaming resins, adhesive resins, surface coating resins, wirecoating resins, or in any process normally employing conventional resins, by suitable choice of components and composition.

It is a property of the products of this invention from certain resin monomer compositions that on melting and cooling the rate of crystallisation is very slow and may range from minutes to hours, even to days. By incorporating crosslinking agents into the melt which are capable of curing the product in a time which is fast compared with the rate of crystallisation, the visco-elastic state prevailing prior to crystallisation may be retained, thereby forming rubbery products. The synthesis of such rubbers, for example, products formed by polymerizing mixtures of polyethylene oxide and methyl methacrylate and crosslinking with di-isocyanates, is part of the invention of this application. Part of the novelty lies in the fact that neither polyethylene oxide nor polymethyl methacrylate is a rubber at normal temperatures.

The block copolymerization process which forms the basis of this application may be carried out in any of the industrial or laboratory equipment which is normally employed for bulk, solution or suspension polymerization. The resin is first dissolved in the monomer or monomers in the desired proportions by stirring and by the application of gentle heat if required. When the resin is only sparingly soluble in the monomer refluxing may be employed or a suitable solvent may be added. Solution of the resin in the monomer may be carried out in an autoclave or other polymerization vessel. The resin is maintained in solution by stirring and gentle heating where required. The desired quantity of initiator where required is then added either as solid, in solution in monomer, solvent or plasticizer, or as a partially plasticized powder. After dispersion of the initiator, when added, the temperature is raised until polymerization commences at the desired rate. As in conventional bulk and solution polymerizations the temperature must be controlled since the reaction is exothermic, and the temperature is preferably maintained below the boiling point of the monomer or monomer solvent mixture at the pressure within the reactor. When the desired degree of polymerization is reached the reaction mixture is run out of the polymerization chamber into suitable moulds or other vessels to continue the polymerization. If necessary the polymerization can be completed in air or vacuum ovens. A one stage polymerization process may be employed. With many resin systems the presence of atmospheric oxygen in the reactor does not appreciably effect the reaction. If in the polymerization of a particular monomer oxygen is normally excluded then in this process the optimum yield of copolymeric products will likewise be obtained when oxygen is excluded during the polymerization stages.

In solution polymerization the resin may be dissolved either in the solvent or in the monomer together with the initiator and polymerization may be completed under reflux.

In suspension polymerization the stabilizers, surface tension modifiers, viscosity modifiers, etc., are added in the normal manner, the resin, as a rule, being dissolved in the monomer component. The beads or pearls from the final reaction product may tend to coalesce when the resin content of the product is high. The processes of this application may also be carried out in the conventional apparatus used industrially or in the laboratory for the preparation of resins, such as resin pots, where monomer can be suitably added and the resin dissolved.

The process of this invention provides a method of synthesizing a new range of polymeric and resinous materials containing relatively high molecular weight vinyl type polymers, relatively low molecular weight resins, and block copolymers of a linear, grafted or complex nature of the two component types. The properties of the products differ widely from either the resin or the vinyl type homopolymer or blends of the two materials. Simple blends of the resins used in this process with high molecular weight vinyl polymers can not easily be obtained by conventional blending or milling techniques.

The ratio of monomer to resin as used in this application is governed by the solubility of the two components, one in the other such as to give a single phase.

This invention is further illustrated by, but is not limited to, the following examples:

*Example 1*

200 g. of brown shellac was dissolved in 200 mls. of deinhibited methyl methacrylate by heating for 5 minutes at 60° C. with constant stirring. A further 20 mls. of monomer containing 2.5 g. of benzoyl peroxide was added and the reaction mixture stirred and the heating continued until the temperature reached 75° C. after a further period of 5 minutes. Heating was stopped at this stage and the heat of polymerization during the ensuing ten minutes raised the temperature to 82° C. before falling to 70° C., stirring being continued throughout. At this stage the reaction product was poured into a metal tray and polymerization completed by maintaining at 70° C. for 3 hours. The product was broken up and final traces of unpolymerized monomer removed by heating in an air oven at 40–50° C. for eight hours. The initial polymerization before casting into the tray took place during a period of 40 minutes. Only 25% of the shellac could be removed by exhaustive hot methanol extraction of the product. From a product prepared by milling at 80° C., of the same total composition, 87% of the shellac was extracted in 24 hours. The product from the copolymerization was greater than 95% soluble in hot benzene. Films cast from this solution were tough and showed no signs of phase separation at temperatures between —40 and 100° C. over periods up to 7 days.

*Example 2*

100 grams of a phenol-formaldehyde resin was dissolved in 100 ml. of inhibited methyl methacrylate by heating the mixture of resin and monomer to 80° C. 1.5 g. of benzoyl peroxide (65% in dimethyl phthalate) was then dissolved in the mixture was maintained at 75° C. for 5 hours. A high softening point resin was obtained which could be cured by combining the product with 5 p.p.h., of hexamethylene tetramine.

*Example 3*

The experiment of Example 1 was repeated using wood rosin place of shellac. During the polymerization stage a temperature of 80° C. was reached at the peak of the reaction. After cooling to 75° C. the product was cast and further heated at 70° C. in an air oven for 4 hours to complete the polymerization. The product from the polymerization reaction was used in a standard rosin varnish composition which gave improved finish, hardness and water resistance.

*Example 4*

250 g. of an epoxy resin (made by the condensation of epichlorohydrin with bis phenol A), was blended with 250 ml. of deinhibited styrene and the temperature raised to 70° C. 2.5 g. of 65% benzoyl peroxide in dimethyl phthalate was dissolved in the resin-monomer mixture and the heat of reaction allowed to raise the temperature to 80° C. at which stage the mixture was cast into water cooled moulds and the temperature maintained at 70° C., for 4 hours to complete the polymerization. The product was a pale yellow waxlike resin with a slight opacity to transmitted light. The product was heated to 85° C. to obtain a low viscosity melt and 100 g. of hexahydrophthalic anhydride blended in. The resin was then cast into a block mould and cured at 100° C. for 3 hours, followed by 3 hours at 150° C. A clear transparent casting with high impact strength and good surface finish was obtained.

*Example 5*

The experiment of Example 4 was repeated omitting the benzoyl peroxide catalyst and carrying out the copolymerisation reaction at 100° C. in a closed reaction vessel with constant stirring for 6 hours. A product similar to that from Example 4 was obtained which had a greater clarity at room temperature.

*Example 6*

50 grams of epoxy resin (made by the condensation of epichlorohydrin with bis phenol A), was dissolved in 100 ml. of methyl methacrylate heated to 80° C. When solution was complete 1 gram of benzoyl peroxide was dissolved in the resin/monomer mixture, and the temperature reduced by cooling to 75° C. After 30 minutes at this temperature the product was heated to 80° C. for 4 hours to complete the polymerization. The product was melt drawn to produce fibres which were thermally cross-linked by incorporating an anhydride/amine curing system into the melt prior to drawing the fibres.

*Example 7*

150 grams of polyethylene oxide (Carbowax 1000) was melted at 75° C. and 150 ml. of methyl methacrylate freed from inhibitor blended into the melt to give an homogeneous solution in which was dissolved 1.5 g. of benzoyl peroxide (65% in dimethyl phthalate). The temperature was maintained at 75° C. for 40 minutes before casting into a mold and completing the polymerization in an air oven at 90° C. over a period of 4 hours. The product was hard slightly waxy solid resin at room temperature which melted to a clear liquid of low viscosity at 100° C. On cooling to 80° C. the product was visco-elastic and on further cooling slowly crystallised over a period of several hours. By incorporating toluene di-isocyanate (10%) into the melt above 80° C. and maintaining the temperature for 4 hours a stiff rubbery product was obtained which kept its rubbery properties at room temperature for several weeks before crystallisation was appreciable. Immersion in water at 100° C. restored full elasticity. Prior to cross-linking the product, only 40% of the polyethylene oxide could be extracted from the product.

What I claim as my invention and desire to secure by Letters Patent is:

1. A process for the production of polymeric materials which comprises:
    (1) adding about an equal amount of methylmethacrylate to melted polyethylene oxide to form a melt,
    (2) adding benzoyl peroxide as a freed radical catalyst to the melt,
    (3) maintaining the melt at a temperature of about 75° C. for about 40 minutes,
    (4) casting said melt into a mold, and
    (5) maintaining the molded melt at an elevated temperature of about 90° C. for a period of about 4 hours to produce a polymeric material which is a hard, slightly waxy solid resin at room temperature.

2. A process for the production of polymeric materials which comprises:
    (1) adding about an equal amount of methylmethacrylate to melted polyethylene oxide to form a melt,
    (2) adding benzoyl peroxide as a freed radical catalyst to the melt,
    (3) maintaining said melt at a temperature of about 75° C. for about 40 minutes,
    (4) thereafter maintaining the melt at an elevated temperature of about 90° C. for a period of about 4 hours,
    (5) cooling the melt to room temperature to produce a polymeric material which is a hard, slightly waxy solid resin,
    (6) reheating the resin to a temperateure of 80° C.,
    (7) mixing toluene diisocyanate with the resin, and (8) maintaining the mixture at a temperature of about 80° C. for about 4 hours to produce a stiff rubbery product.

References Cited in the file of this patent

UNITED STATES PATENTS

| 2,300,074 | Strain | Oct. 27, 1942 |
| 2,822,345 | Duhnkrack et al. | Feb. 4, 1958 |
| 2,824,851 | Hall | Feb. 25, 1958 |
| 2,840,447 | Green | June 24, 1958 |
| 2,991,269 | Nozaki | July 4, 1961 |

FOREIGN PATENTS

| 1,222,944 | France | Jan. 25, 1960 |